Oct. 6, 1931.  G. J. MILLER  1,826,560

SEED DRILL

Filed March 15, 1928

Inventor:
George James Miller,
By Byrnes, Stebbins & Parmelee
Attys

Patented Oct. 6, 1931

1,826,560

UNITED STATES PATENT OFFICE

GEORGE JAMES MILLER, OF CHELSFIELD, ENGLAND

SEED DRILL

Application filed March 15, 1928, Serial No. 261,911, and in Great Britain March 26, 1927.

This invention relates to seed drills of the type in which seed is supplied from a hopper to a controlling delivery valve having peripheral spaces, constituting seed receptacles which transfer the seed supply from the hopper to a delivery opening or chute from which the seed is discharged into the furrow, or the like prepared in the soil for its reception. More particularly it relates to that class of seed drill wherein the delivery valve set in close proximity to the ground operates within an enclosing valve case and is not supplied directly from the hopper but is connected to the hopper through a tapering conduit or seed receptacle into which seed is delivered in an approximately continuous stream but at a restricted rate so that the respective peripheral spaces in the delivery valve do not completely fill up with seed but contain only such restricted quantity of seed as has been delivered through the hopper to the conduit or receptacle; in consequence of this the seed is delivered to the furrow not continuously along its whole length but only intermittently so as to form bunches or patches in the seed furrow. A drill of this general type and class is described for instance in my prior British specification No. 237,391.

The object of my invention is to construct a drill of the type and class described which shall be less liable to derangement in use, i. e. shall be more reliable than those hitherto constructed, shall screen the falling seed from the deflecting effects of windage, and at the same time lend itself to economic production by ordinary manufacturing methods.

In carrying out my invention I so construct the delivery valve that it need be machined, or otherwise made accurately to fit its enclosing case or box, on its peripheral surface only. The side cheeks of the valve which, in an attempt to prevent seed detritus and the like from jamming between the moving surface of the valve and its containing box, have hitherto had to be machined accurately to fit the surrounding box or case, are in seed drills constructed in accordance with this invention made with clearance, and in order to retain any débris and prevent the jamming action indicated above, they are blanked over with thin discs or the like so that the seed receptacles in the valve are walled in within the valve structure itself, and, excepting only on the peripheral surface, are independent of the walls of the valve case. On the peripheral surface the valve box closes the seed receptacles in those areas between the opening from the seed delivery to the valve and the discharge opening from the valve to the furrow.

I further arrange the conduit from the supply hopper or the like so that at the point immediately adjacent to the periphery of the moving valve, the width of its opening is less than the width of the receptacles in the valve. By this means the risk of introducing seed débris between the cheeks of the valve and the walls of its enclosing case or box is obviated.

The walls of the valve box are preferably continued downwards round the discharge orifice, excepting towards the rear, so as to form a depending shield to screen the falling seed from the deflecting action of any breeze during its fall after release from the valve to earth.

In the accompanying drawings:—

Like reference numerals indicate like parts throughout the drawings.

Figure 1:
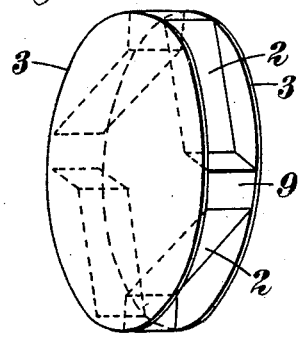
Figure 1 is a skeleton perspective view of the movable member or valve.
Figure 3:
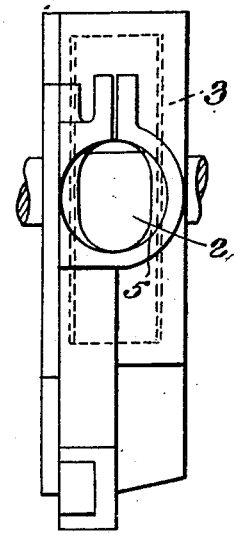
Figure 3 is a detail end view of the tapered seed conduit.
Figure 2:
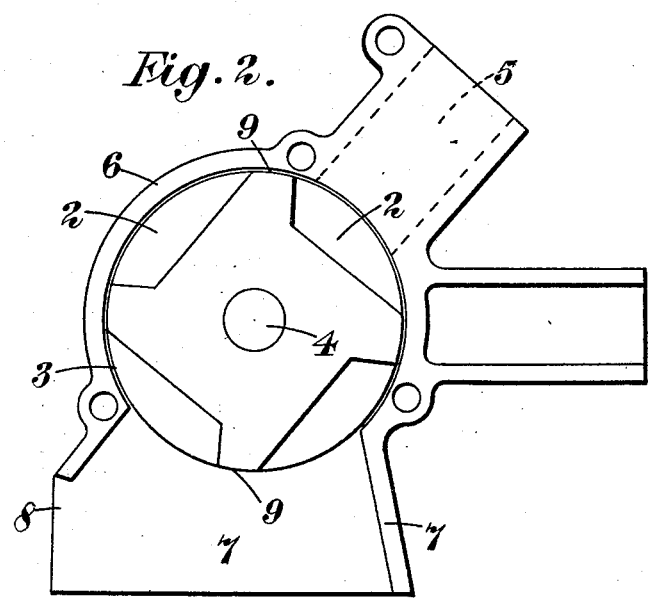
Figure 2 shows, by way of example, a side view of part of a seed drill, with the cover plate removed, constructed according to this invention.

In Figure 2 the valve 1 is drawn with the blanking disc adjacent to the observer removed so as to show the peripheral spaces or seed receptacles 2 and the blanking disc 3 on the far side. In Figure 1 the operating spindle, shown at 4 in Figure 2, has, in order to avoid confusion, been omitted. The conduit 5 from the supply hopper is made so that at its delivery end its width is less than the distance between the cheeks 3 (see particularly Figure 3); thus the seed is supplied more or less into the central space of the seed receptacles and no risk is incurred of delivering offal or seed detritus into the clearance spaces between the side cheeks 3, and the walls of the valve box 6. Depending walls 7 surround the discharge orifice, excepting as shown at 8, and form, as already described, a wind shield.

Figure 4:
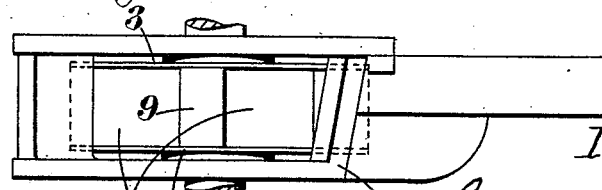
Figure 4 is a detail under plan showing the relatively inclined edges of the seed receptacles and casing.

In the particular form of seed drill shown in the accompanying drawings, the ends 9 of the projections separating the seed receptacles in the valve are shown as formed square on the side cheeks 3, so that, as the valve releases underneath, the opening extends substantially along the whole width of the valve. These ends 9 are made of appreciable length measured along the periphery of the valve as shown in Figure 1 so that they do not easily wear away, as would the end of a thin partition, and destroy the peripheral running fit already described. It will be realized, however, that in drills of this class, the contents of the seed receptacles are discharged at intervals, depending upon the speed of operation of the valve along the line of motion of the drill, and in order more suitably to dispose on discharge, the several seeds contained in any pocket I shape the releasing edge of the valve box and the corresponding edge of the receptacles of the seed valve so that they are relatively inclined (see particularly Figure 4). In this manner the opening of the valve on the lower or discharge orifices commences at one side, and thereafter progressively extends over the whole width.

The actual valve in seed drills constructed according to this invention may, it is manifest, be operated either by continuous rotary motion or by an intermittent movement such for instance as oscillation.

I claim:—

1. A seed drill arranged to deliver seeds intermittently comprising a casing having a cylindrical wall formed with intake and discharge apertures and two side walls formed with bearing apertures, a shaft extending through the bearing apertures and supported by the side walls, a rotary delivery valve having peripheral spaces constituting seed receptacles, and two side cheeks secured one to each side of the valve and arranged to fit closely at their peripheries against the cylindrical wall of the casing and to be spaced away from the side walls of the casing.

2. A seed drill arranged to deliver seeds intermittently, comprising a casing having a cylindrical wall formed with intake and discharge apertures and two side walls formed with coaxial bearing apertures and having its internal cylindrical surface and its bearing apertures only machined, a shaft supported in the bearing apertures, a valve member secured on said shaft within the casing, formed with peripheral recesses extending across its width and having its peripheral surface only machined to fit closely the internal cylindrical surface of the casing, and side cheeks secured to the valve member on either side, spaced away from the side walls of the casing and machined on their peripheral surface only to fit closely against the internal cylindrical surface of the casing.

3. A seed drill of the type and class referred to comprising a casing having a cylindrical wall and two side walls closing the ends of the cylindrical wall and formed in the cylindrical wall with an intake aperture of less width than the width of the cylindrical wall and with a discharge aperture, a rotating shaft supported by the side walls to extend through the casing, a valve member of greater width than the width of the intake aperture mounted on the shaft of the casing, side cheeks on the valve member each fitting closely the cylindrical wall of the casing but spaced away from the adjacent side wall of the casing.

4. A seed drill of the type and class referred to comprising a shaft, a valve member secured to the shaft and formed with recesses extending across its width, two annular plates secured one to each side of the valve member to close the ends of the recesses, a casing having a peripheral wall fitting closely to the peripheries of the valve member and the plates and two side walls spaced away each from the adjacent plate and formed each with an aperture to receive and support the shaft, a conduit formed integral with the top of the casing and having its lower end of less internal width than the width of the valve member, and a wind shield formed integral with the bottom of the casing to shield a discharge aperture in the latter.

In testimony whereof I affix my signature.

GEORGE JAMES MILLER.